United States Patent [19]

Keast et al.

[11] Patent Number: 5,721,585

[45] Date of Patent: Feb. 24, 1998

[54] DIGITAL VIDEO PANORAMIC IMAGE CAPTURE AND DISPLAY SYSTEM

[76] Inventors: Jeffrey D. Keast, 20 Riga Rd., Dover, Mass. 02030; John F. Buford, P.O. Box 1223, Lowell, Mass. 01853

[21] Appl. No.: 695,078

[22] Filed: Aug. 8, 1996

[51] Int. Cl.$^6$ .................................................. H04N 13/00
[52] U.S. Cl. ................................ 348/36; 348/38; 348/47
[58] Field of Search ............................ 348/36–39, 42–60

[56] References Cited

U.S. PATENT DOCUMENTS

| | | | |
|---|---|---|---|
| 4,100,571 | 7/1978 | Dykes et al. | 348/36 |
| 4,241,985 | 12/1980 | Globus et al. | |
| 4,395,093 | 7/1983 | Rosendahl et al. | |
| 4,484,801 | 11/1984 | Cox. | |
| 4,532,544 | 7/1985 | Federau. | |
| 4,613,898 | 9/1986 | Bagnall-Wild et al. | 348/36 |
| 4,670,648 | 6/1987 | Hall et al. | 348/36 |
| 4,787,725 | 11/1988 | Preussner et al. | 348/36 |
| 4,977,323 | 12/1990 | Jehle. | |
| 4,982,092 | 1/1991 | Jehle. | |
| 5,022,723 | 6/1991 | Schmidt et al. | |
| 5,130,794 | 7/1992 | Ritchey | 348/42 |
| 5,262,867 | 11/1993 | Kojima. | |
| 5,305,035 | 4/1994 | Schonherr et al. | |

Primary Examiner—Tommy P. Chin
Assistant Examiner—Luanne Din

[57] ABSTRACT

A system performing capture and display of both still and real-time motion picture panoramic images comprised of 360 degrees in azimuth and ±180 degrees in declination for a virtual spherical field of view wherein image capture is achieved via a horizontally scanned vertical slit image passing through a fish-eye lens, mirrors, and prisms rotated under servo motion control onto a stationary line-scan sensor to build up a continuous two dimensional image. A host computer system monitors a position encoder on the optical head, sends motion commands to the servo controller, controls sampling rate and integration time for the line-scan sensor, and does image data processing, encoding, and storage. Additional mechanisms in the optical head permit optical and solid-state image magnification, selective field of view and sub-sampling of pixel data, optical horizon shifting, and streak and slit-scan camera effects. Image display is possible either through various methods of mapping the spherical image to a conventional flat display, or using the same optical head to project the image onto the interior of a spherical screen. Synchronous image scanning and projection from a single optical head is accommodated. Variations on the optical head includes options for stereoscopic imagery and miniaturized optics. Designs permitting both adaptive and interactive control of image capture and display are presented.

26 Claims, 7 Drawing Sheets

DIGITAL VIDEO PANORAMIC IMAGE CAPTURE AND DISPLAY SYSTEM

BACKGROUND OF THE INVENTION

1. Field of the Invention
2. Description Relative to the Prior Art

The present invention relates to video-rate panoramic recording and projection systems which use an image derotator to decouple the rotation of the optics from the sensor so that the sensor is stationary. Such systems are used for both optical and infrared spectra and have a 360 degree annular recording window.

In the following discussions, the term "three-dimensional image" is used to mean the incident light which provides an input to the panoramic recording and projection systems, wherein this incident light is the result of illuminating a three-dimensional object or objects.

The term "light" is used to mean electromagnetic radiation, irrespective of the wavelength involved. The most common wavelengths for the systems described herein are in the visible and infrared regions; however, other parts of the spectrum may be appropriately used in conjunction with this invention.

The term "azimuth", together with its variants is used to mean an angular displacement in the plane of the horizon.

The term "declination", together with its variants, is used to mean an angular displacement in the vertical direction, or in the direction normal to the horizon.

The prior art teaches panoramic recording systems of various kinds, some of which use derotation, and some of which also allow recording and projection of a 360-degree, wide-angle vertical image area. However, the present invention not only allows for this expanded coverage, but further provides for video-rate capture. In addition, the present invention accomplishes this task with a novel combination of elements which can be inexpensively and easily manufactured.

The still-image slit scan panoramic camera (U.S. Pat. No. 4,241,985, Globus et al) is an early panoramic camera with film recording. It features radial rotation of a slit over photographic film with a speed governor to ensure uniform imaging. It does not address video-rate capture or projection. It does not address 180 degree vertical capture.

The line-scan panoramic TV camera (U.S. Pat. No. 4,532,544, Federau) is a rotating optical assembly which images onto a linear array sensor, and which is coupled to a stationary base with electronics and power passed through a multichannel optical rotary joint without mechanical contacts. The linear sensor is displaced coaxially from the slit so that the head optics can be minimized in size for applications which require camera insertion in small openings. This design requires a rotating signal transmission unit which increases costs. However, the design does not allow a 180 degree vertical view of the image.

A panoramic camera (U.S. Pat. No. 5,262,867, Kojima) for object search records three dimensional position, azimuth, focus amount, and zoom amount with each panoramic image. However, Kojima does not disclose or claim a method or apparatus for implementing the scanning of the panoramic image, and does not appear to be suitable for video rate image recording.

A panoramic camera with objective drum (U.S. Pat. No. 5,305,035, Schonherr et al) images onto a rotating objective drum through a slit, with light-catching grooves located near the edges of the imaging window. The imaging window restricts the azimuthal range to less than 360 degrees. This invention doesn't address real-time video.

A panoramic periscope for two spectrum ranges (U.S. Pat. No. 5,022,723, Schmidt et al) shows a panoramic periscope which uses a spectrum divider in the optical path to permit bispectral viewing, such as day and night. It does not have an image counter-rotating prism. The design does not include video-rate recording or projection.

A lens system for 360 degree panoramic viewing and projection uses hyperbolically surfaced mirrors (U.S. Pat. No. 4,395,093, Rosendahl et al). This design uses a large number of optical components which increases costs. The system has a 360-degree annular field but the vertical range is less than 180 degrees. Another lens system (U.S. Pat. No. 4,484,801, Cox) improves the Rosendahl design by requiring fewer lenses and by providing improved response to heating that occurs during projection. However, this system does not provide an 180-degree vertical view.

A 360 degree infrared surveillance system includes a panoramic display (U.S. Pat. No. 4,977,323, Jehle). The projection sub-system and capture sub-system of the Jehle invention are directly coupled by using the output of the detectors to drive the amplifiers for LEDs. It uses two stages of detectors in which the first stage of infrared detectors are used to drive optical detectors. However, this system does not provide 180 degree vertical view and has no record capability. It uses a derotator prism on the capture side to decouple to driver optics from the rotating projection lenses.

A 360 degree optical surveillance system (U.S. Pat. No. 4,982,092, Jehle) provides a different coupling. The projection sub-system and capture sub-system are directly coupled by using the output of the detectors to drive the amplifiers for LEDs. This system runs at 1/30th second rate per panoramic image, but it does not provide 180-degree vertical view or a record capability. It uses a derotator prism on the capture side and doesn't permit the same optics to be used for both capture and projection.

The present invention utilizes a scanning technique in which a three-dimensional image is constructed by scanning the field of view with a wide-angle, or "fish-eye" lens incorporated into the scanning head. It is essential that the fish-eye lens provide a wide angle of capture in the vertical, or altitudinal direction. However, only a thin vertical slice of this image, located near the image center, is used. The scanning head is rotated in the horizontal, or azimuthal, direction. As the scanning head is thus rotated, the vertical image slice paints the image onto the recording surface. Previous panoramic cameras paint the image onto an annulus or ring, or project the image onto a rectangular strip. The Jehle U.S. Pat. No. 4,982,092 describes such a process in detail.

The present invention avoids the necessity for an annular recording surface. Instead, it uses a linear array of detectors to record the image slice as a series of dots, or pixels, arranged in a vertical line. The use of such linear arrays is well known in digital photographic applications. When an image is focused on the array, each sensor in the array provides an electrical signal proportional to the intensity of light incident upon that sensor. The resulting electrical signals may then be stored electronically, and can be used to reconstruct the image which generated the signals. This electronic image storage is contrasted to the traditional means of storing light images on photographic film.

These detectors are effective in both visual and infra-red portions of the spectrum. Accordingly, the current invention may be used for both optical and infra-red applications. A discussion of this subject may be found in L. J. Kozlowski, W. F. Kosonocky, "Infrared Detector Arrays", in *Handbook of Optics*, vol. 1, pp. 23.1–23.37.

As the panoramic scanning proceeds, the vertical image slice is constantly projected onto the linear detector array, whose time-varying outputs are stored for later processing, or processed in real time.

Maintaining the image slice on the linear detector array requires that either the array be moved synchronously with the scanning head, or that the image be "derotated" by optical system means which reduce the moving image slice from the scanning head to the stationary image slice focused on the detector array.

In the present invention the "derotation" approach is used in the preferred embodiments.

The use of detector arrays is now becoming common in photographic applications. Its should be noted, however, that the technique of wiping an image across a linear array of n elements has some inherent advantages as opposed to using a two-dimensional array of n×m elements, which constitutes a competing implementation. The use of the linear array requires the manufacture of a significantly smaller number of elements per detector, thus reducing the effects of yield on cost. For instance, a 1000 by 1000 grid of detectors contains 1,000,000 elements. Manufacturing a grid of this size with no defects requires the discarding of a substantial number of exemplars before producing a perfect array. On the other hand, the same effect may be obtained by wiping an image across a linear array of 1000 elements. Producing a perfect 1000 element linear array can be done much more cost effectively, due the substantially higher yield effected during the manufacture of such a linear array, as compared to the 1,000,000 element array.

The manufacturing yield of defect free sensors is largely dependent of the probability of single sensor site defect and the total number of sites per sensor. Consequently, commercially available linear arrays have a maximum resolution in one axis of just over 8000, whereas maximum resolution of area arrays is limited to about 1000 in each axis. For these reasons, even as manufacturing processes achieve higher resolutions, we can expect our design based on using a linear array will always provide higher resolution than systems based on using area sensors.

A further consideration in the number of array elements in the camera is the impending use of high-definition TV (HDTV). For this application, the number of array elements should be equal or greater than 2000, which is the upper limit of the vertical dimension of standards for HDTV.

It is further noted that the present invention may be implemented with or without an intermediate storage device. In the instance where the result of the panoramic scan is viewed in real time, the output of the linear array may be processed into a real-time display without the need for storage. On the other hand, the output of the array may be stored electronically for later use. Another alternative is to expose photographic film which moves in the direction of the scan during exposure.

A final advantage of the current invention is the reduction or control of "aliasing", or distortion of objects which have a motion component in the direction of panoramic scanning. Aliasing is a well-known effect in panoramic photography, and it is sometimes purposely done for the special effects it produces in photographs. The current invention can be used to minimize aliasing due to the inherently high speed of the scan. Alternatively, aliasing can also be purposely produced and controlled using the present invention, because of the invention's inherent ability to control the scanning speed.

SUMMARY OF THE INVENTION

The limitations and disadvantages of the prior art discussed above are overcome by the present invention. It is an object of the present invention to allow video rate (30 rotations per second or more) recording and projection of 360 degree azimuth and 180 degree vertical scenes.

It is a further object of this invention to provide for said video rate, wide-angle recording and projection without complex or unusual lens assemblies or costly coupling electronics between a rotating head and rotating sensor or optical emitter.

It is a still further object of this invention to provide a complete and uniform imaging of the sphere of view, with a minimum of annular distortion.

According to one aspect of the invention, a panoramic digital video camera for recording incident light from three-dimensional images comprises a scanning head comprising a rotating wide-angle lens which collects the incident light, azimuthal means of rotating the scanning head, a linear array sensor axis, optical means for projecting the light from the lens onto the sensor; and means for maintaining the light projected from the lens stationarily on the sensor during scanning. When the scanning head is rotated a vertical slice of incident light collected by the lens is constantly projected onto the sensor array, which produces an electrical signal from which the image can be reproduced.

According to another aspect of the invention the optical means for projecting the light from the lens stationarily on the sensor during scanning further comprises a 45 degree front surface mirror, a dove prism counter-rotated to the scanning head, a first achromatic relay lens, a second achromatic relay lens, and a front-surface mirror.

The incident light from the lens is reflected along the axis of rotation by the 45 degree front surface mirror, which then is relayed by the achromatic relay lens to the dove prism which derotates the image and passes it to the second relay lens which converges the image onto the front-surface mirror which then projects the image stationarily onto the sensor array.

According to still another aspect of the invention the front-surface mirror is replaced by a beam-splitter which passes incident light from an emitter array back through the optical system for projection onto a spherical surface, while the incoming image is imaged onto the linear sensor array.

According to yet another aspect of the invention the linear array is of the type which allows images to be captured, stored and projected at rates of 30 or more images per second.

According to still another aspect of the invention the camera further comprises means for recording the images sensed by the linear arrays.

According to a final aspect of the invention two identical cameras are fixed in location with respect to each other at a stereographic separation, whereby the two cameras together may be used to produce stereoscopic images and recordings.

DETAILED DESCRIPTION OF THE PREFERRED EMBODIMENTS

Figure 1:
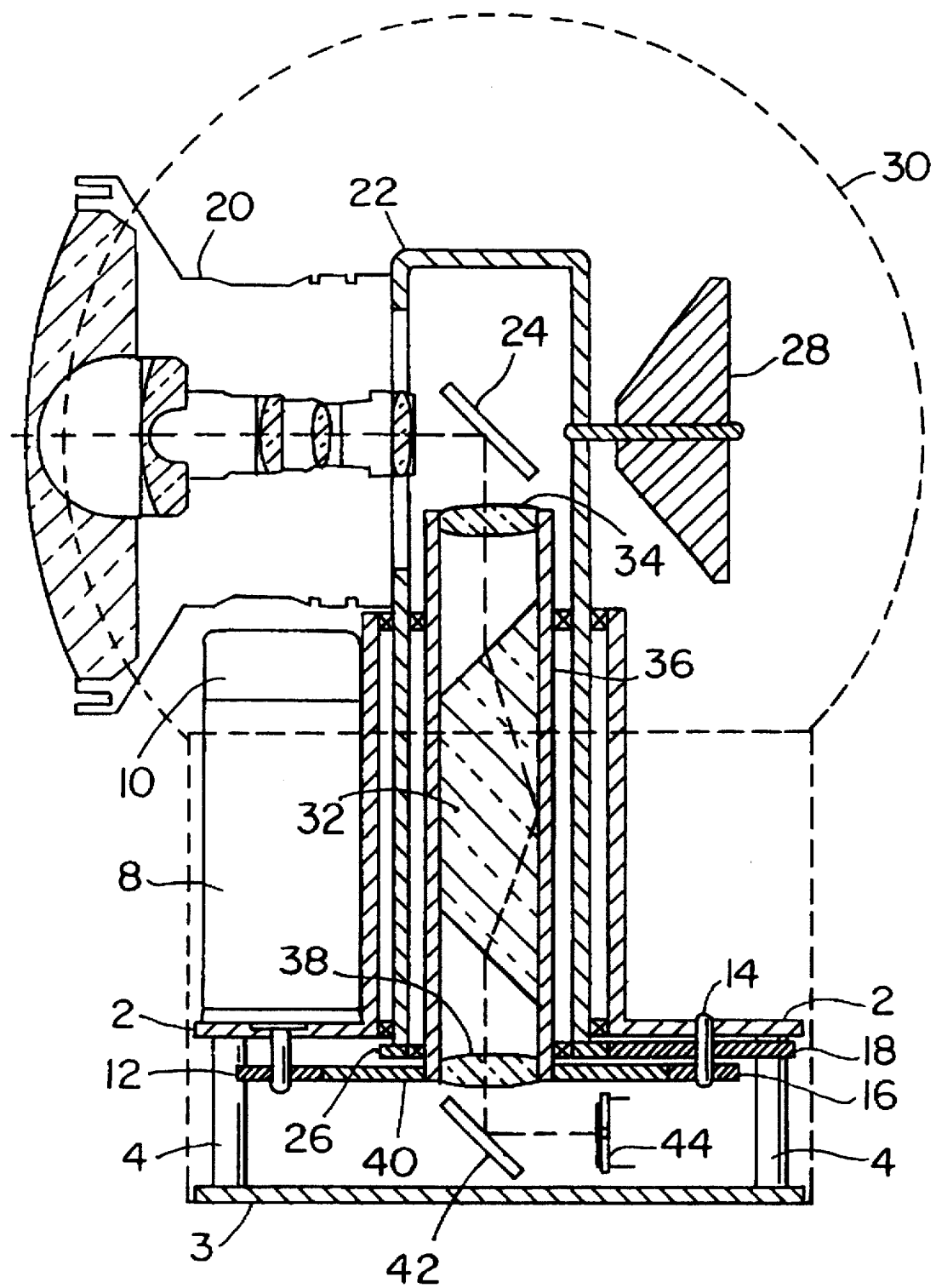
FIG. 1 depicts a side cross-section view of the optical system for optical or infrared recording.

The invention uses a rotating scanning head which contains a fish-eye lens orthogonal to the axis of rotation. The fish-eye lens provides a 180 vertical view, while the rotation of the lens provides a 360 degree azimuthal view, together providing a complete and uniform imaging of the sphere of view. Annular distortions are minimized by using a motor drive which is linear with minimal rotational variation. Vertical distortion is minimized by using only a narrow vertical slice from the fish-eye lens. Geometrical distortion found in systems which create a panoramic scene from a mosaic of two dimensional individually recorded areas is eliminated because of the construction of the panoramic image from very fine vertical slices of the original scene.

Light from the fish-eye lens is reflected along the axis of rotation by a 45 degree front surface mirror. An achromatic relay lens is used to extend the focal length of the lens system. After the first relay lens is a dove prism which derotates the image and which is counter-rotated to the scanning head at half the rotational speed. A second relay lens converges the image onto a stationary linear array sensor. The rotational movement of the head scans out a 360 degree annular view, with each vertical slice of the panorama coming from the fish-eye lens and being imaged onto the linear array. Single panoramic images, video-rate panoramic movies, and very high frame-rate panoramic images can all be recorded, due to the response time of the linear arrays as well as the inherent ability of the current invention to operate at scanning speeds beyond thirty revolutions per second, a typical sampling rate used to achieve smooth motion rendition. Sampled images are written to a frame store and displayed at 60 Hz or more where the flicker rate is higher than that noticeable by human beings. Frame rate is determined by the rotational speed of the camera, the integration period of the sensor, and the average intensity of the incident light.

Those familiar with the art will recognize that linear array sensors are manufactured in various number of sensor elements and spectral responses. The number of vertical samples in the digitized image is determined by the number of sensor elements in the linear array. The number of horizontal samples in the digitized image, for a given frame rate, depends on the sensitivity and the integration time of the sensor. Subsampling of the output of the linear array can be used to obtain images with lower vertical and horizontal sample resolution.

Further, using a beam splitter in the axis plus sensors with desired spectral responses can permit simultaneous capture of multiple spectral ranges. Similarly, a beam splitter that sends incident light along the forward path to the sensor and passes along the reverse path the output of a projector permits the system to be used for simultaneous projection and recording. It is expected that for projection, a high-intensity (i.e., 30× brighter than normal systems for given distance from screen) projection beam is needed to compensate for the scanning method of projection used here, and that rates higher than 30 revolutions per second may be needed to avoid the perception of flicker.

Panoramic scenes can have large light intensity variations that extend beyond the dynamic range of sensors and display devices. In this invention, dynamic control of the integration time of the sensor is used to normalize intensities in the horizontal direction so that a shorter integration time is used for high intensity vertical slices. In this invention, intensity variation in the vertical direction is normalized by scaling the samples after the samples have been shifted out of the sensor into a secondary buffer or frame grabber. In both cases, dynamic range correction can be controlled either automatically or by the user of the panoramic camera.

The angle and position of the second front surface mirror sensor with respect to the axis of the light flow can be varied from the 45 degree position to control the position of the horizon in the image. Increasing the angle raises the horizon, and decreasing the angle lowers the horizon. The sensor mount angle and displacement can be adjusted manually or by motorized control to control the focus of the incident image when the front surface mirror is adjusted.

Using micro-optic techniques, the scanning optics including lens and mirror can be miniaturized. This permits the head to be inserted into small diameter openings. To permit the mechanical "decoupling" of the rotational axis of the scanning optics from the axis of rotation of the derotator, the output of the scanning head mirror can be transmitted over a fiber optic bundle to the derotator prism assembly. This decoupling means that the axis of the scanning optics need not be collinear with the axis of the scanning optics, thus permitting greater flexibility in the layout of the optical system.

The rotating mirror reflects onto a fiber optic bundle which carries the image to an arbitrarily distant point for transmission to the counter-rotating prism and related optics. The rotating head is driven by a remote motor, coupled by a small diameter cable that is parallel with the fiber optic bundle and whose end is moved by the motor to rotate the head. The miniaturized rotating head and the counter-rotating prism assembly are synchronized in a 2:1 ratio.

Stereoscopic recording is obtained by imaging two laterally displaced light paths through the same derotational assembly to two different linear arrays which represent the left and right view of the stereo image. The lateral displacement is made sufficient to obtain depth-of-field perception. Stereoscopic projection is obtained by transmitting the output of the emitters along the light path in the reverse direction.

The first embodiment, as depicted in FIG. 1, shows the optics for 360 degree annular and 180 azimuth imaging at imaging rates of 30 or more rotations per second. A mounting plate 3 supports base plate 2 through four cylindrical standoffs 4. Motor 8 fitted with encoder 10 drive shaft and gear assembly 12 to derotator assembly 36 drive gear 40, which drives the idler gear 16 through idler shaft 14 to idler gear 18. Idler gear 18 drives the rotation of the scanning assembly 22 through the scanning assembly gear 26. Alternatively, gear 16 can be removed and shaft 14 converted to a drive shaft for a second motor which can rotate the scanning assembly 22 independently of the derotation assembly 36 to produce visual affects such as slanting or skewing of the image.

Light enters through fish-eye lens assembly 20 which is mounted to the scanning assembly 22 and counter balanced by the weight 28. Light is incident on the front surface mirror 24 of the scanning assembly. Light enters the first achromatic relay lens 34 of the derotator assembly 36. Light passes through the derotator dove prism 32 then exits the second achromatic relay lens 38 to the front surface mirror 42 to be incident on the linear array 44.

Shroud 30 encloses and is attached to the optical head scanning assembly 22 so that the shroud rotates with the scanning assembly. Derotator assembly 36 rotates in a counter direction to scanning assembly 22, and at half the rotational rate, while the linear array 44 and mounting plate 3 are fixed.

Figure 2:
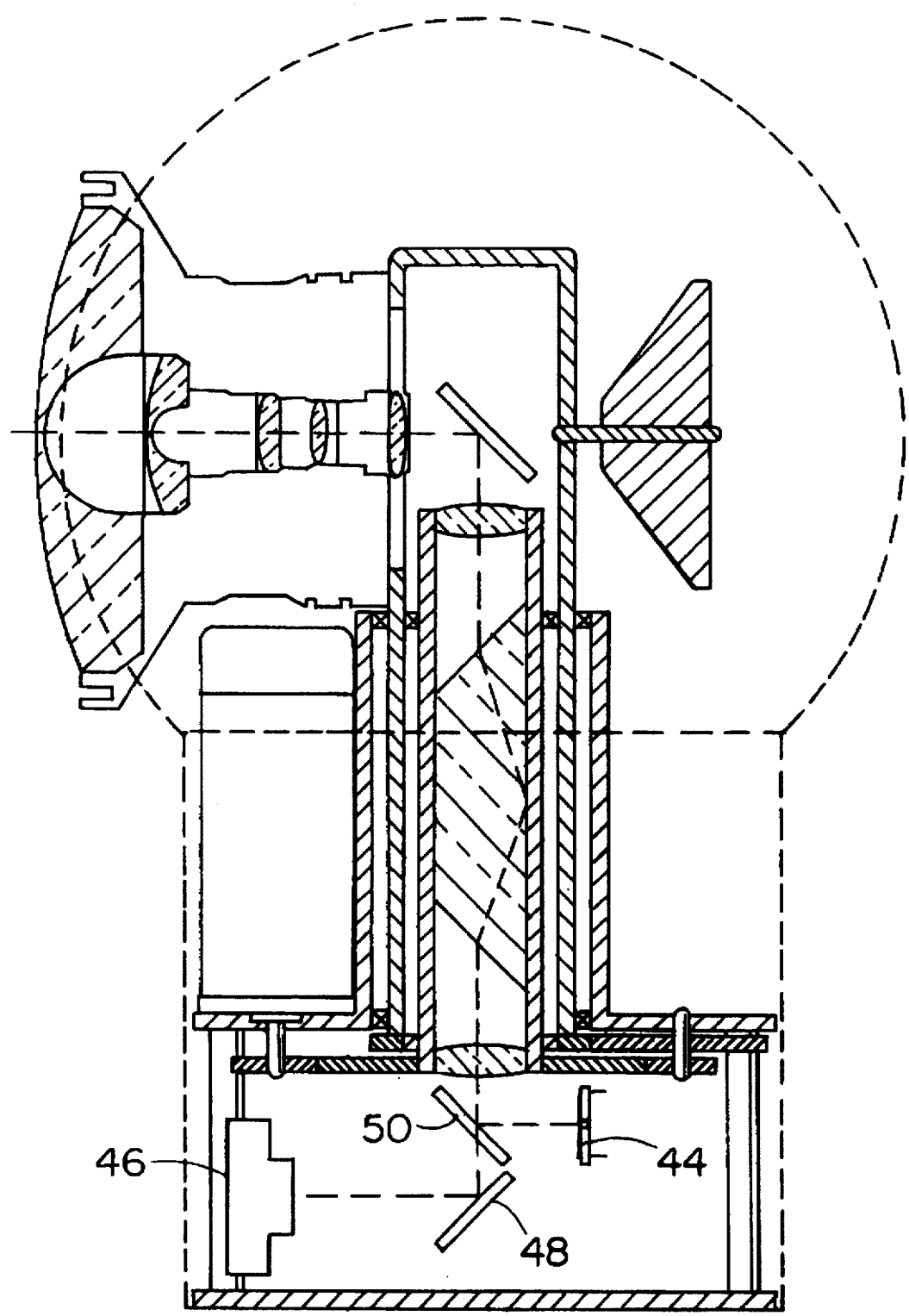
FIG. 2 depicts a side cross section of the optical system for simultaneous recording and projection.

A second embodiment, as depicted in FIG. 2, performs simultaneous projection and recording. The front surface mirror 42 in FIG. 1 is replaced in FIG. 2 by a beam splitter 50. A linear array of optical emitters or other optical projector 46 emits light onto front surface mirror 48, is passed through the beam splitter 50 and then along the reverse direction of the recording light path through the optic assembly described in FIG. 1.

Figure 3A:
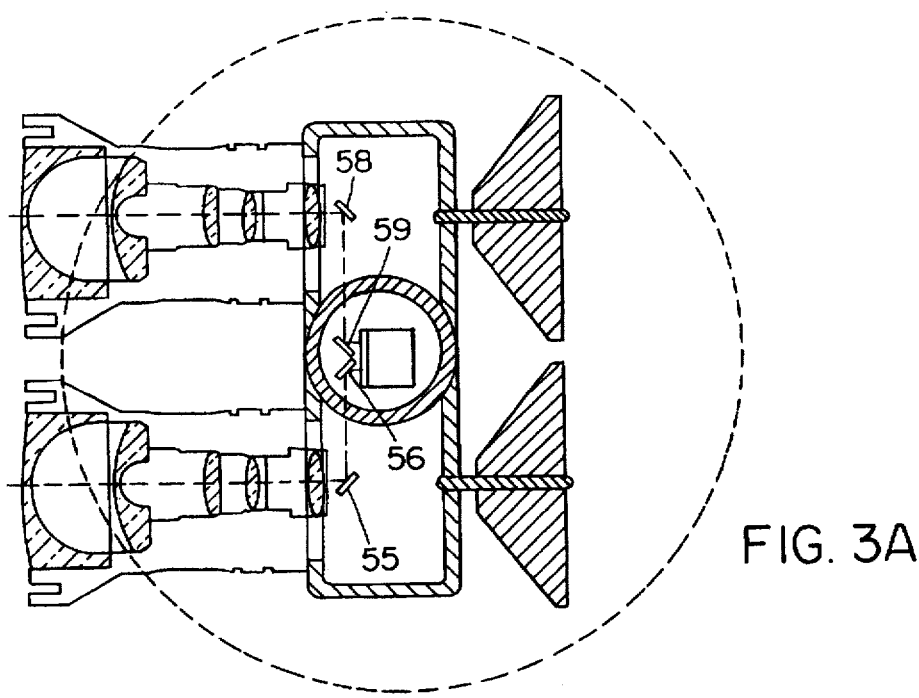
FIG. 3A depicts a top view of the stereoscopic panoramic record system.
Figure 3B:
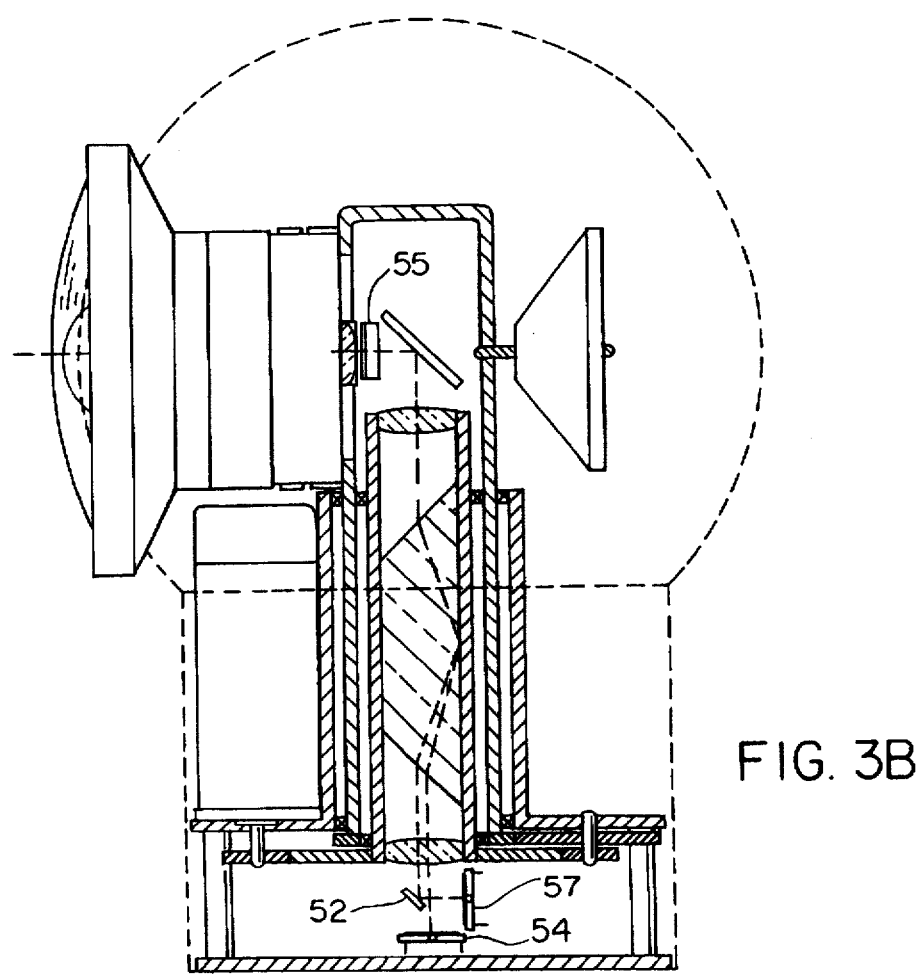
FIG. 3B depicts a side cross-section view of the stereoscopic panoramic record system.

A third embodiment, as depicted in FIGS. 3A and 3B, performs stereoscopic recording. Two fish-eye lenses are mounted displaced horizontally by the inter-occular distance. The output of each lens goes to a sequence of front surface mirrors 55 and 56 which channel the left field of view through the derotator, and 58 and 59, which channel the right field of view through the derotator, and by means of which the light paths, slightly displaced, are directed through the derotating prism assembly. Another displaced mirror 52 in the base intercepts one of the light paths and sends it to the sensor 57 while the other sensor 54 receives the second light path.

Figure 4:
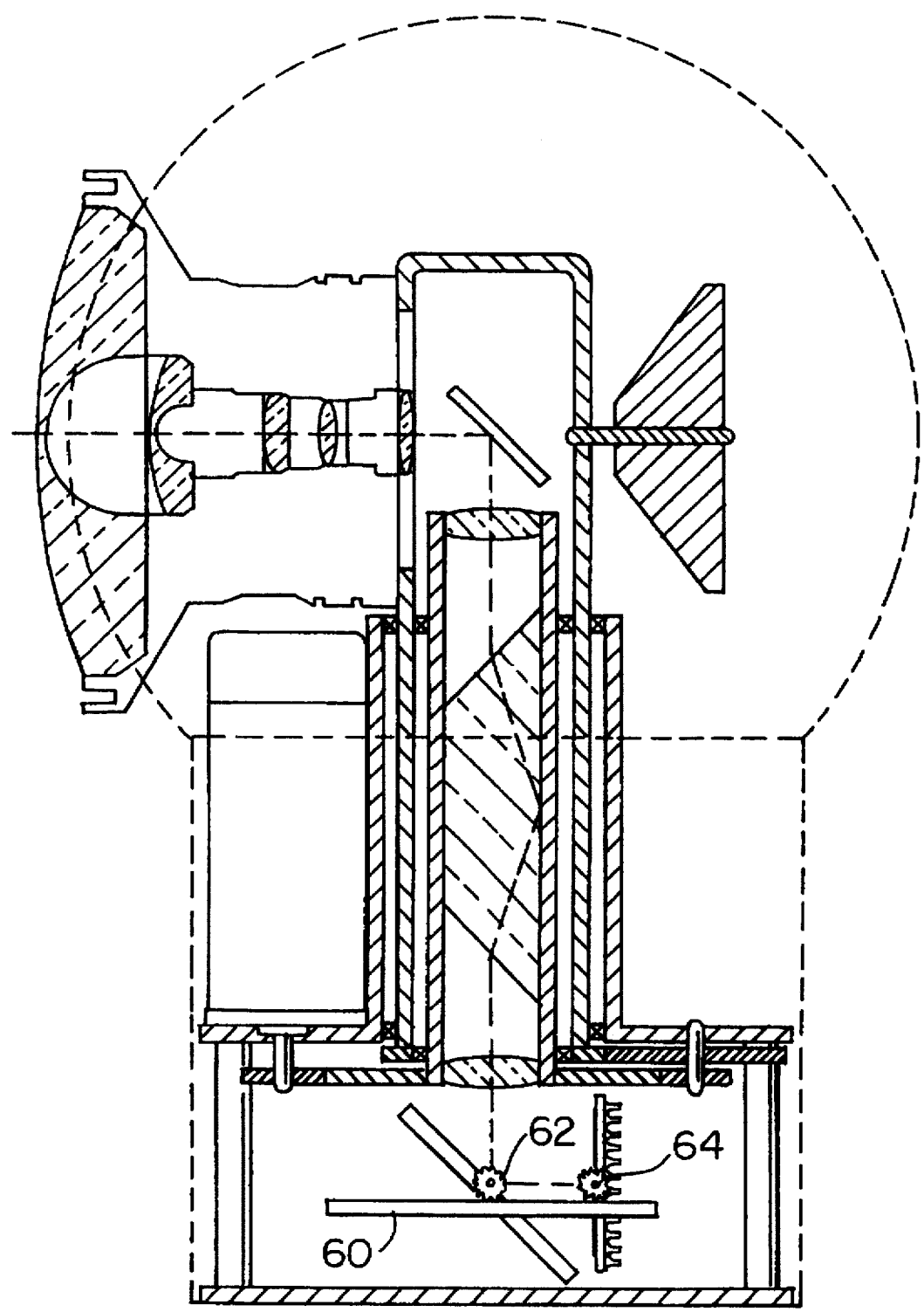
FIG. 4 depicts a side cross-section view of the sensor system for horizon control.

A fourth embodiment, as depicted in FIG. 4, teaches the addition of a stationary rack 60 and two independent pinions for horizon control. Pinion 62 controls rotation and displacement of the front surface mirror and pinion 64 controls angular position and displacement of the linear array sensor or emitter. The two pinions can be used to change the position of the horizon while retaining focus.

Figure 5:
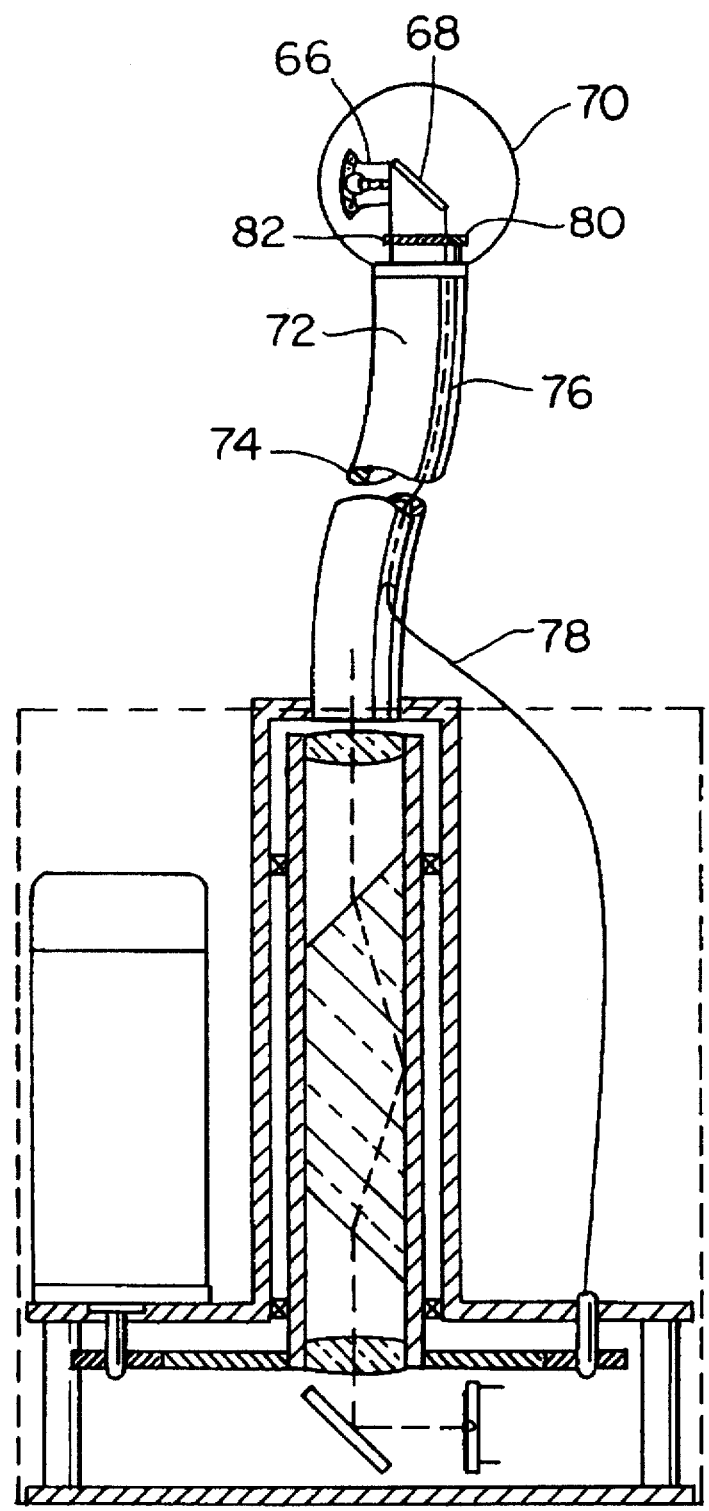
FIG. 5 depicts the embodiment utilizing a miniaturized head with flexible optical bundle system.

A fifth embodiment, as depicted in FIG. 5, utilizes a detached and miniaturized head. A miniature lens 66 images onto a mirror 68 and are both enclosed in a transparent globe 70. The mirror 68 images onto a coherent flexible fiber optic bundle 72 which is enclosed in a flexible cylindrical sheathing 74. A drive wire conduit 76 is also enclosed in the cylindrical sheathing 74. The drive wire 78 is enclosed in the drive wire conduit 76 and is attached to a pinion gear 80 which meshes with a ring gear 82 to turn the lens and mirror assembly. The fiber optic bundle 72 projects the transmitted light onto the derotating prism assembly for reception by the stationary linear array as before. The fiber optic bundle 72, enclosing conduit 76, and transparent globe 77 are non-rotating. Additional conduits can be added into the fiber bundle sheathing 74 to provide features such as a light source at the head, remote control of the orientation of the head, or other mechanical manipulators.

For digitized high resolution still panoramic images the vertical and horizontal resolution limits are determined as follows. For a given vertical field of view, vertical resolution of the final image is directly determined by the number of sensor elements in the linear array. The maximum vertical field of view for the camera is 180 degrees, but by changing the linear array sensor angle (sensor skewing), the vertical field of view can be lowered, effectively increasing the resolution for the given field of view and producing an effect known as zooming. For a given frame rate, the horizontal resolution of the image is determined by the linear array sensor sensitivity and the sensor integration time. Higher sensitivy and lower integration times allow the linear array sensor to be clocked more frequently, permitting more horizontal samples for a given rotational speed of the scanning head. As the rotational speed of the scanning head is reduced, the number of samples for the horizontal field of view increases.

Figure 6:
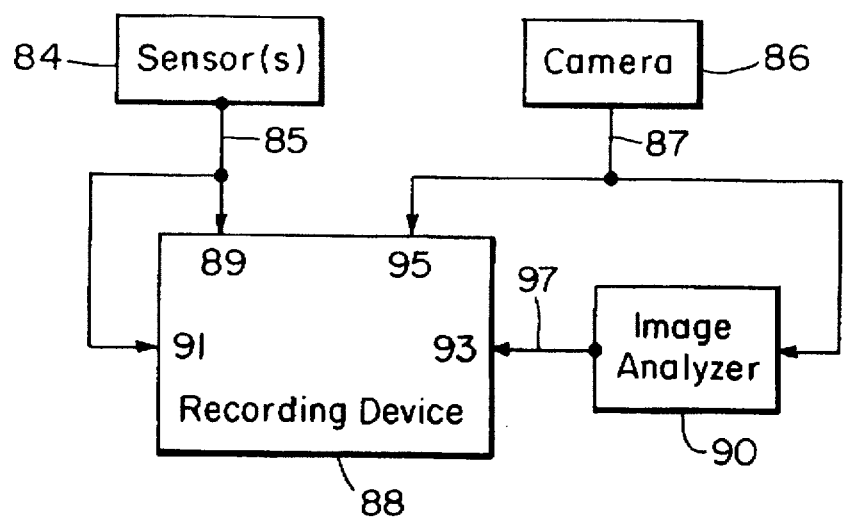
FIG. 6 depicts a block diagram for an embodiment in which additional sensor data is recorded with, or used to trigger the recording of the video data.

A sixth embodiment shows the invention incorporating additional sensors for triggering the recording of a panoramic image on to an external storage media or providing additional data that is recorded with the video data. A sensor providing navigational information, including altitude, latitude and longitude position can be used to record the camera's position during video data recording. A sensor can directly process and analyze the video data from the linear array, for example performing motion detection or object identification, to trigger the recording of the video data. Other sensors include current time, infrared, motion detection, and ambient light intensity. FIG. 6 depicts a block diagram of this embodiment.

Referring now to FIG. 6, the panoramic video camera 86 produces digital data 87 which is received by a data input interface 95 of the recording device 88. The digital video data is also received by an Image Analyzer 90 which process the video data to detect motion, specific object features, scene changes or other attributes of the video data. The output of the image analyzer 97 is received by the trigger input 93 of the recording device 88 to signal when recording of the video data should begin and end.

One or more sensors 84 produce sensor data 85 which is received by a data input interface 89 of the recording device 88 for recording with the video data. The sensor data is also received by trigger input 91 of the Recording Device to indicate when the recording of the video data should begin and end.

Figure 7:
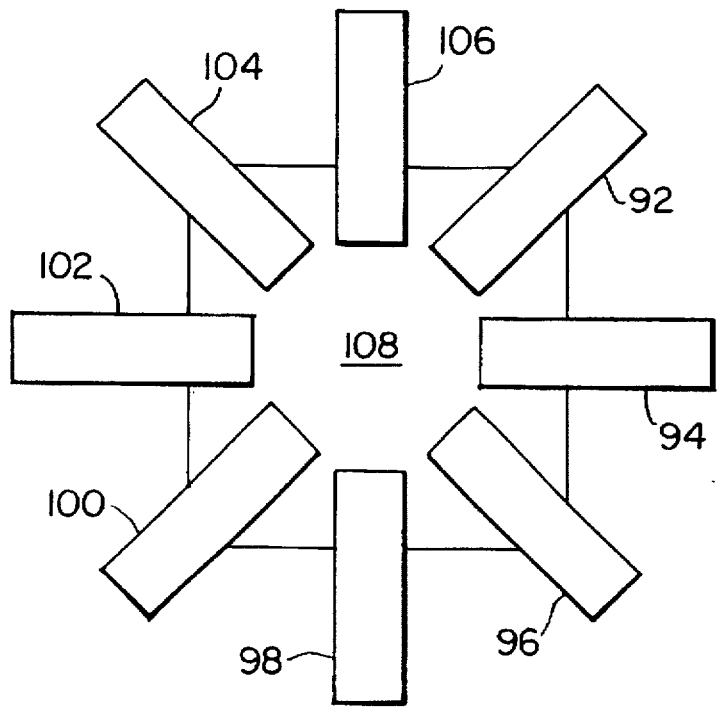
FIG. 7 depicts an array of directional microphones used in conjunction with the panoramic camera in one of the preferred embodiments.

An seventh embodiment shows that existing directional microphones can be combined with the panoramic camera to provide simultaneous panoramic audio and video capture. Such directional microphones can be mounted at the base of the camera at different radial angles to provide sufficient field coverage in each direction. The recorded multi-channel audio signal can be used by existing audio production and presentation systems to re-create a three-dimensional sound sensation during projection and viewing of the panoramic video, and allow the user to pan or zoom the panoramic image in the direction of specific sounds. FIG. 7 depicts this embodiment, and shows an octagonal array of 8 microphones, 92, 94, 96, 98, 100, 102, 104, and 106, grouped around a central axis 108, which is also the axis of rotation of the scanning head of the camera.

Figure 8:
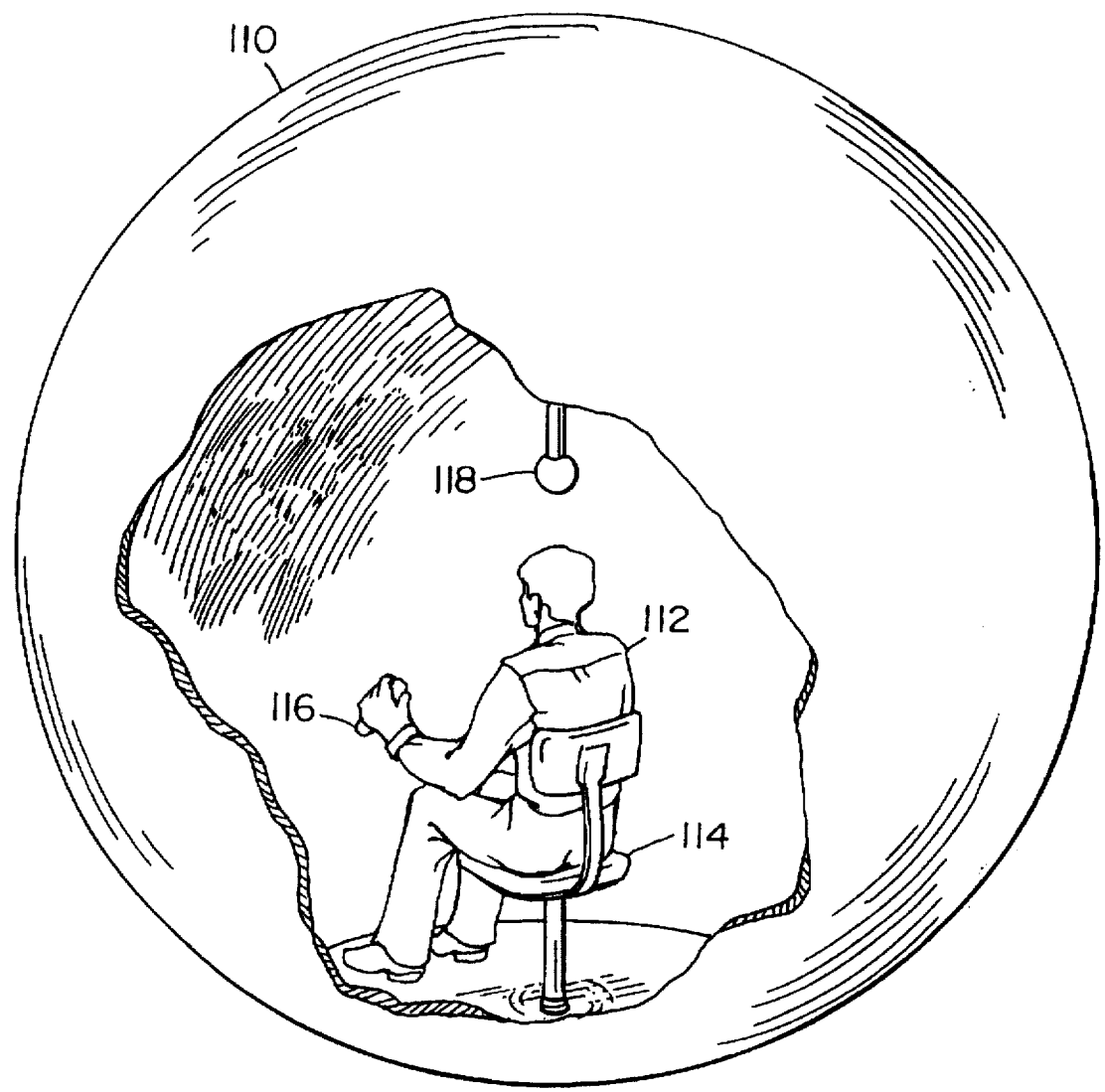
FIG. 8 depicts a spherical display module used in conjunction with the panoramic camera.

An eighth embodiment, depicted in FIG. 8 shows a spherical display module 110 in which a viewer 112 is seated in a rotating chair 114. The chair is pysically rotatiable. The image captured by the panoramic camera is projected by means of projector 118 onto the inner surface of the sphere. The viewer may pan or tilt the projected image a mouse 116 which senses attitude and orientation by means of an internal micro-gyroscope, or the equivalent. This rotation may be either in azimuth, declination, or both, depending upon the orientation of the mouse.

Obviously many modifications and variations of the present invention are possible in light of the above teachings. It is therefore to be understood that within the scope of the appended claims the invention may be practiced otherwise than as specifically described.

What is claimed as new and desired to be secured by Letters Patent of the United States is:

1. A panoramic digital video camera for recording incident light from three-dimensional images comprising:

a scanning head comprising a rotating wide-angle lens which collects the incident light;

azimuthal means of rotating the scanning head;

a linear array sensor axis;

optical means for projecting the light from the lens onto the sensor, which includes:
a 45 degree front surface mirror;
a dove prism counter-rotated to the scanning head;
a first achromatic relay lens;
a second achromatic relay lens; and
a front-surface mirror; and means for maintaining the light projected from the lens stationarily on the sensor during scanning, whereby when the scanning head is rotated a vertical slice of light collected by the lens is reflected along the axis of rotation by the 45-degree front surface mirror, which then is relayed by the achromatic relay lens to the dove prism which derotates the image and passes it to the second relay lens which converges the image onto the front-surface mirror which then projects the image stationarily onto the sensor array, an electrical signal is produced from which the image can be reproduced.

2. The camera according to claim 1, wherein the front-surface mirror is replaced by a beam-splitter which passes incident light from an emitter array back through the optical system for projection onto a spherical surface, while the incoming image is imaged onto the linear sensor array.

3. The camera according to claim 2 wherein the linear array is of the type which allows images to be captured, stored and projected at rates of 30 or more images per second.

4. A high-resolution camera according to claim 3, wherein the number of array elements is equal to or greater than 2000, whereby the camera may be used in conjunction with HDTV images.

5. The camera according to claim 4, further comprising means for adjusting the front surface mirror, and in which the azimuthal span is controlled by adjusting said front surface mirror.

6. The camera according to claim 5, farther comprising means for adjusting the linear array, and in which the azimuthal resolution may be varied with varying azimuth angles by controlling said linear array.

7. The camera according to claim 6 in which by additional sensors, navigational position information can be used to trigger the automatic capture of an area, and camera position and orientation data can be recorded with each image.

8. The camera according to claim 4, wherein the optics and linear arrays permit display and recording of both optical and infra-red images.

9. The camera according to claim 6 further comprising:
means to control intensity of the image at the linear array sensor and
means to normalize the input data,
whereby horizontal intensity correction at the camera are performed by intensity control means; and vertical intensity corrections are performed by said means to normalize the input data.

10. The camera according to claim 6, further comprising a flexible fiber optic cable located between the fish-eye lens and the means for derotation of the image, whereby the means for derotation are physically decoupled from the scanning head.

11. The camera according to claim 6 further comprising a second means of control over the scanning head, said second means of control being independent of the first means of control, whereby certain real-time specific effects or controlled distortions, such as slanting or stretching of the picture can be created thereby.

12. The camera according to claim 6 further comprising:
a system of directional microphones;
means for determining the direction of a sound from the output of the microphone system, and
means for controlling the scanning head are controlled by the sound direction, whereby audio directionality can be recreated during projection using conventional audio techniques.

13. The camera of claim 11, further comprising:
a spherical viewing module having an interior viewing surface and containing a viewing position;
means to process the output of the sensor array;
means to convert the processed output of the sensor array into a display image;
means to project the display image on the interior surface of the viewing module; and
means to rotationally control the relative position of the display image and the viewing position,
whereby when a viewer is located at the viewing position within the viewing module, a realistic reproduction of the display image may be seen by the viewer on the interior surface of the viewing module, and may be moved relative to the viewer.

14. The camera according to one of claims 1 through 12, further comprising means to store the output of the sensor array.

15. A panoramic digital video camera for recording incident light from three-dimensional images comprising:
two scanning heads, each comprising a rotating wide-angle lens which collects the incident light, said heads being fixed in location with respect to each other at a stereographic separation;
azimuthal means of rotating the scanning heads;
two linear sensor arrays, one corresponding to each scanning head;
optical means for projecting the light from the two lenses onto the sensor arrays;
means for maintaining the light projected from the lenses stationarily on the sensors during scanning;
whereby when the scanning heads are rotated a vertical slice of incident light collected by each lens is constantly projected onto the corresponding sensor array, which produces electrical signal from which the image can be stereoscopically produced and recorded.

16. The camera according to claim 15 wherein the linears array are of the type which allows images to be captured, stored and projected at rates of 30 or more images per second.

17. A high-resolution camera according to claim 16, wherein the number of array elements in each array is equal to or greater than 2000, whereby the camera may be used in conjunction with HDTV images.

18. The camera according to claim 17, wherein the optical means for projecting the light from the lens stationarily on the sensor during scanning further comprises 45 degree front surface mirrors, further comprising means for adjusting the front surface mirrors, and in which the azimuthal span is controlled by adjusting said front surface mirrors.

19. The camera according to claim 17, wherein the optics and linear arrays permit display and recording of both optical and infra-red images.

20. The camera according to one of claims 17 through 19, further comprising means to store the output of the sensor arrays.

21. The camera according to claim 18, further comprising means for adjusting the linear arrays, and in which the azimuthal resolution may be varied with varying azimuth angles by controlling said linear arrays.

22. The camera according to claim 21, in which by additional sensors, navigational position information can be used to trigger the automatic capture of an area, and camera position and orientation data can be recorded with each image.

23. The camera according to claim 21, further comprising:
means to control intensity of the image at the linear array sensors and
means to normalize the input data,
whereby horizontal intensity correction at the camera are performed by intensity control means; and vertical intensity corrections are performed by said means to normalize the input data.

24. The camera according to claim 21, further comprising a flexible fiber optic cable located between each wide-angle lens and the means for derotation of the image, whereby the means for derotation are physically decoupled from the scanning heads.

25. The camera according to claim 21, further comprising a second means of control over the scanning heads, said second means of control being independent of the first means of control, whereby certain real-time specific effects or controlled distortions, such as slanting or stretching of the picture can be created thereby.

26. The camera according to claim 21 further comprising;
a system of directional microphones;
means for determining the direction of a sound from the output of the microphone system, and
means for controlling the scanning heads are controlled by the sound direction,
whereby audio directionality can be recreated during projection using conventional audio techniques.

* * * * *